United States Patent
Mayer et al.

[11] Patent Number: 5,273,419
[45] Date of Patent: Dec. 28, 1993

[54] APPARATUS FOR PRODUCING MONODISPERSE POWDER FROM RUBBER OR RUBBER ARTICLES

[75] Inventors: Dieter Mayer; Burkhard Freist, both of Hanover, Fed. Rep. of Germany

[73] Assignee: Hermann Berstorff Maschinenbau GmbH, Hanover, Fed. Rep. of Germany

[21] Appl. No.: 936,312

[22] Filed: Aug. 28, 1992

[30] Foreign Application Priority Data

Aug. 29, 1991 [DE] Fed. Rep. of Germany ....... 4128630

[51] Int. Cl.⁵ .............................................. B29C 47/40
[52] U.S. Cl. ...................... 425/204; 366/83; 425/205; 425/208; 425/209
[58] Field of Search ............ 425/204, 205, 208, 209; 264/211.21, 211.23; 366/81–83, 88, 89

[56] References Cited

U.S. PATENT DOCUMENTS

| | | | |
|---|---|---|---|
| 3,462,332 | 8/1969 | Goto | 425/205 X |
| 3,609,828 | 10/1971 | Compa et al. | 425/205 X |
| 3,913,796 | 10/1975 | Aoki | 425/205 X |
| 4,077,754 | 3/1978 | Borcher et al. | 366/83 X |
| 4,127,372 | 11/1978 | Perla et al. | 425/205 X |
| 4,746,478 | 5/1988 | Fujisaki et al. | 425/205 X |
| 4,752,135 | 6/1988 | Loomans | 425/204 X |
| 4,863,363 | 9/1989 | Haring | 425/208 X |
| 4,890,996 | 1/1990 | Shimizu | 264/211.23 X |
| 4,940,329 | 7/1990 | Dienst | 425/208 X |
| 4,976,904 | 12/1990 | Bilhorn | 425/209 X |

FOREIGN PATENT DOCUMENTS

| | | |
|---|---|---|
| 2145728 | 3/1972 | Fed. Rep. of Germany . |
| 2315587 | 3/1974 | Fed. Rep. of Germany . |
| 62-164521 | 7/1987 | Japan ................... 425/205 |

*Primary Examiner*—Richard L. Chiesa
*Attorney, Agent, or Firm*—Walter Ottesen

[57] ABSTRACT

The invention relates to an apparatus for producing monodisperse powdered rubber and includes an extruder and individual conveying, grinding and discharge sections with respective cooling units corresponding thereto. The cooling units are arranged outside of the extruder and receive the grinding stock after each grinding process in order to cool and transport the stock to the feed opening of the following conveying, grinding and discharge section of the extruder.

15 Claims, 3 Drawing Sheets

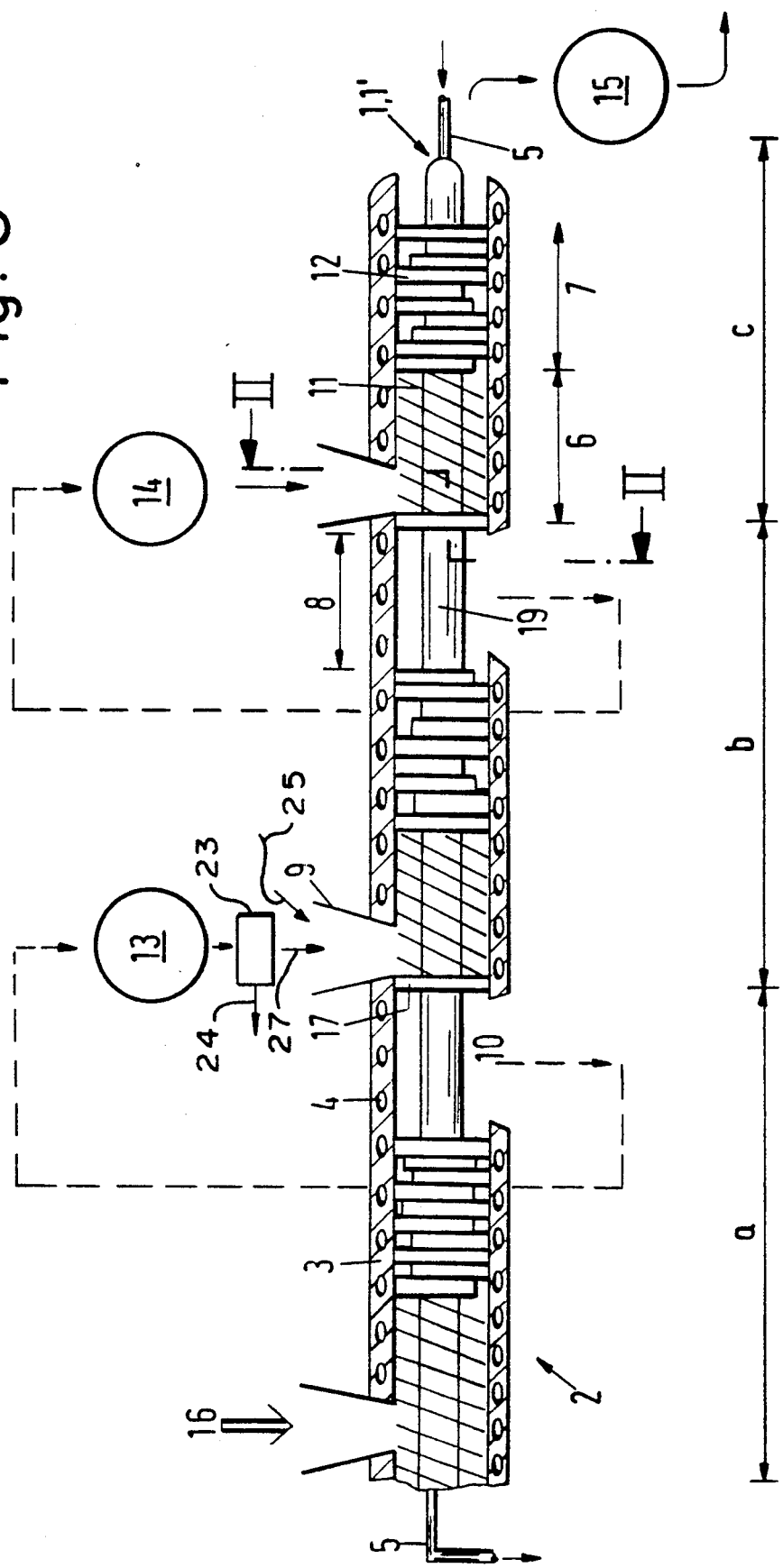

APPARATUS FOR PRODUCING MONODISPERSE POWDER FROM RUBBER OR RUBBER ARTICLES

BACKGROUND OF THE INVENTION

For the purpose of profitable reutilization, waste rubber or rubber products need to be ground to a monodisperse powder of the minimum possible grain size. This powder can then be successfully used as a high-grade filler or additive for the production of new rubber articles. Firstly, this kind of rubber recycling helps to reduce the amount of waste, and secondly, it contributes to returning a valuable raw material into the production cycle.

The processes and apparatuses that are known so far for pulverizing such polymers have not brought satisfactory results. Published German patent application 2,145,728 (corresponds to U.S. patent application Ser. No. 071,896, filed Sep. 14, 1970), for example, describes a process for the production of reusable rubber or caoutchouc from waste rubber, which brings the waste rubber into contact with a cryogenic medium, thus cooling it down to a temperature of below −40° C. The resulting brittleness of the material facilitates mechanical crushing to fine powder without the individual rubber grains agglomerating. The disadvantage of this process and other processes that are based on making the material brittle by means of cooling is the very high energy requirement, which renders the powdered rubber too expensive a raw material for new rubber articles.

In addition, published German patent application 2,315,587 discloses an apparatus for pulverizing rubber material by introducing the rubber material between a rotor of elliptical cross section and the surrounding housing. By rotating the rotor in relation to the housing, shearing and frictional forces are exerted on the rubber material and break it up in a continuous flow into particles of the required size. According to a preferred embodiment, the rubber material allows particularly effective pulverization if it is fed into the housing under pressure or if it is forced into the housing while the external diameter of the inner housing walls is changed continuously.

The experience gained with this apparatus or similar ones was not satisfactory. On the one hand, a line with variable inner housing diameter operating economically with this process was too expensive from a technical point of view, and on the other hand, the powdered rubber produced in this way did not show the desired fineness and widely monodisperse distribution with regard to the grain diameter. This is mainly due to an insufficient heat removal from the ground stock, thus causing already finely ground rubber particles to agglomerate to larger grains. Furthermore, the screening of the powdered rubber, which is necessary for its reutilization, increased the cost of the powder considerably.

SUMMARY OF THE INVENTION

In view of the above, it is an object of the invention to provide an apparatus that allows to produce, at moderate cost, fine powder from rubber and rubber articles whose powder grains, in relation to their mean grain diameter, present only a small dispersion.

The apparatus of the invention is for producing monidisperse powder from rubber or rubber articles. The apparatus includes: an extruder defining a flow direction and including a housing and a plurality of extruder sections disposed in the housing one downstream of the other in the flow direction; each of the extruder sections being subdivided into a conveying zone, a grinding zone and a discharge zone; each of the extruder sections having a feed opening formed in the housing so as to permit rubber stock to be ground to be passed into the conveying zone; each of the extruder sections having a discharge opening formed therein so as to permit the ground rubber stock to be discharged from the discharge zone; an extruder screw rotatably mounted in the housing so as to extend through the sections and being subdivided into a plurality of segments corresponding to respective ones of the sections; each of the segments including: conveying flight means formed thereon in the conveying zone and combined conveying and grinding flight means formed thereon in the grinding zone; the flight means being formed on each segment of the extruder screw so as not to extend into the discharge zone; a plurality of transport and cooling units mounted outside of the extruder; each one of the transport and cooling units including conveying means for conveying the ground rubber stock from the discharge opening of one of the sections to the feed opening of the next section directly downstream of the one section; and, each one of the transport and cooling units including cooling means for cooling the ground rubber stock as the ground rubber stock moves between the discharge and feed openings of mutually adjacent ones of the sections.

The fact that the ground stock can be removed from the extruder after every individual process and transported to the cooling unit that corresponds to the particular extruder section is of special importance for the efficiency of the apparatus of the invention. After having left the particular grinding section, the rubber can be cooled down in the cooling unit corresponding thereto so as to ensure that an agglomeration of the already finely ground portion of rubber is avoided. The ground stock, which is thus cooled down to a temperature of approximately 20° to 80° C., can subsequently be fed into the following conveying and grinding zone of the extruder where it can be ground more finely still until the thermal agglomeration limit is reached.

An advantageous embodiment of the invention is provided with a cooling unit that consists of a cooling spiral conveying device by means of which the ground stock is conveyed vertically upwardly on an oscillating conveying spiral and at the same time cooled either actively via cooling channels in the conveying spiral or passively by the surrounding air. Another practical example also allows the vertical transport and the cooling of the ground rubber stock to be effected by means of a blower or a countercurrent air cooling device with the ground particles being collected above the extruder in a solid matter separator and fed into the feed opening of the next extruder section.

For favorable utilization of both cooling and conveying systems, the discharge openings of the extruder are arranged on the bottom end of the extruder so that the ground rubber stock leaves the extruder solely under the influence of gravity and the pressure of the following extrudate.

In order to prevent the ground rubber stock in the extruder from being conveyed further from one discharge zone to the next conveying zone, a plate that is firmly connected to the extruder housing and leaves a passage only for the screw shaft(s) can be mounted in the housing at the upstream end of each conveying zone.

BRIEF DESCRIPTION OF THE DRAWINGS

The invention will now be described with reference to the drawings wherein.

DETAILED DESCRIPTION OF THE PREFERRED EMBODIMENTS

Figure 1:
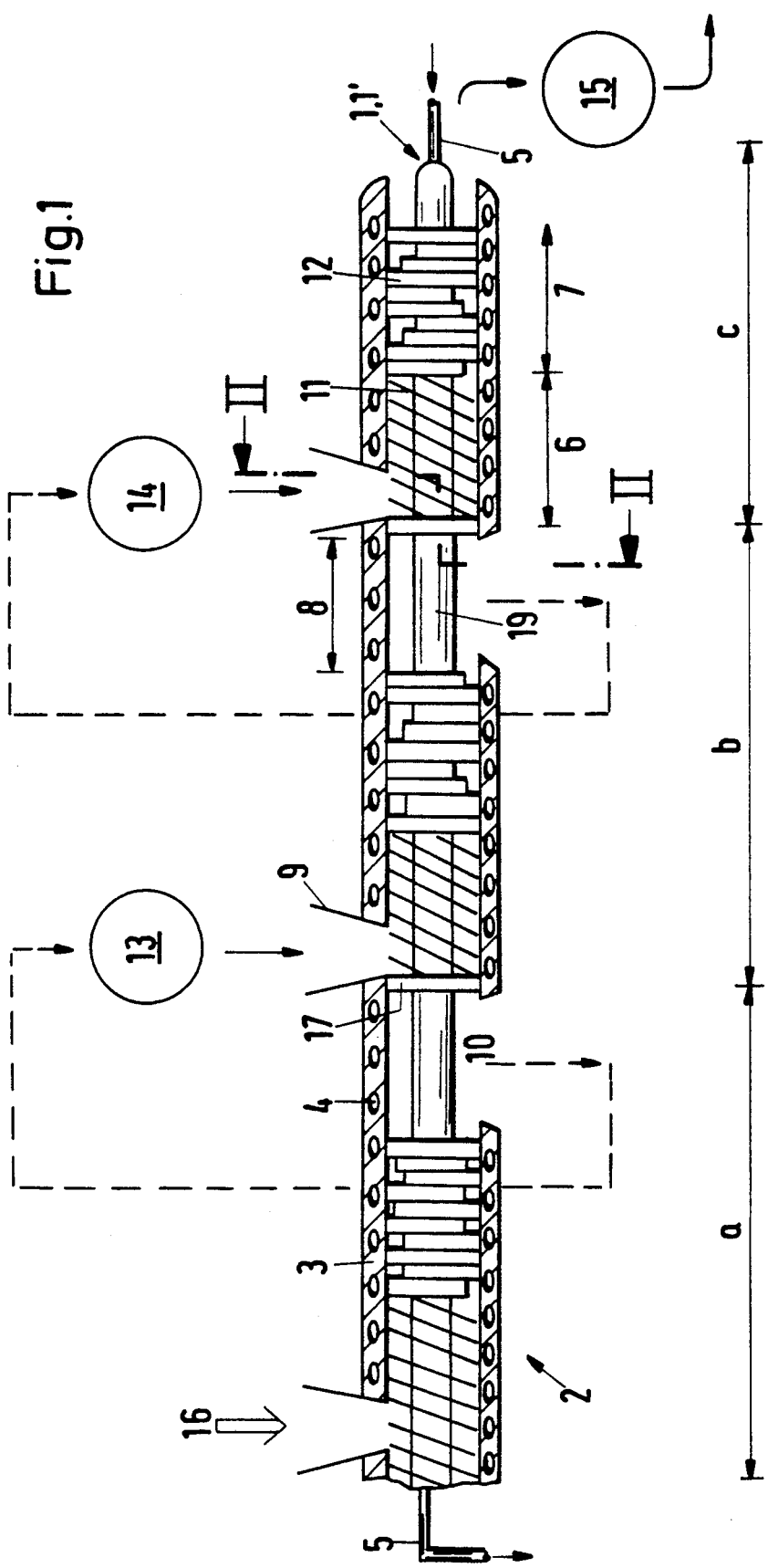
FIG. 1 is a side elevation view, partially in section, of a twin-screw extruder showing one of the screws.

The side elevation view of the twin-screw extruder 2 in FIG. 1 shows that with rubber pulverization it is decisive to work with a pulverizing apparatus that ensures both a mechanical crushing of the grinding stock and the removal of the thermal energy introduced into the grinding stock by the process of crushing. For this reason, the extruder 2 includes a housing 3 with cooling channels 4 as well as the extruder screws (1, 1') provided with cooling channels 5 in the screw shaft 19. These cooling devices (4, 5) alone, however, are not sufficient for avoiding an agglomeration of the already finely ground rubber particles. Therefore, the apparatus is provided with further cooling devices (13, 14, 15), through which the ground rubber stock is continuously conveyed, cooled, and returned to the extruder.

The twin-screw extruder 2 designed for this task basically includes the housing 3, the extruder screws (1, 1') and an extruder drive (not shown). The drive drives the closely-intermeshing extruder screws 1 and 1' in the same direction. The housing 3 and the extruder screws (1, 1') are cooled as described above.

The extruder can be divided into several identical extruder sections (a, b, c), which all have a conveying zone 6, a grinding zone 7, and a discharge zone 8. Each conveying zone 6 is provided with a feed opening 9 in the extruder housing 3, and each discharge zone 8 is provided with a discharge opening 10 also in the extruder housing 3.

In the conveying zone 6 of each extruder section (a, b, c), the extruder screws (1, 1') are provided with conveying screw flights 11 while each grinding zone 7 has grinding and conveying screw flights 12. In the discharge zones 8, the extruder screws 1 and 1' only consist of the flightless screw shafts 19.

A special embodiment of the invention has the housing feed openings 9 arranged on the upper side and the discharge openings 10 on the lower side of the extruder housing 3, although the discharge opening 10 at the downstream end of the extruder may be designed to open in conveying direction.

In order to avoid an unwanted transport of the ground rubber stock in the extruder from one discharge zone to the next conveying zone while circumventing the cooling unit outside the extruder, a spectacle-shaped plate 17 is mounted in the extruder housing 3 immediately in front of the upstream conveying zone and closely surrounds the screw shafts 19 thereby blocking the processing space of the extruder section in the downstream direction.

The rubber pulverization apparatus comprises the twin-screw extruder and the cooling units (13, 14, 15). These cooling units are arranged outside the extruder 2 and provide cooling and conveying (broken line arrows) of the ground rubber stock from one discharge opening 10 of an upstream extruder section to a feed opening 9 of the next extruder section downstream (refer also to FIG. 2). Only the last cooling unit 15 conveys the finished ground rubber stock to a packing device (not shown) mounted downstream.

Figure 2:
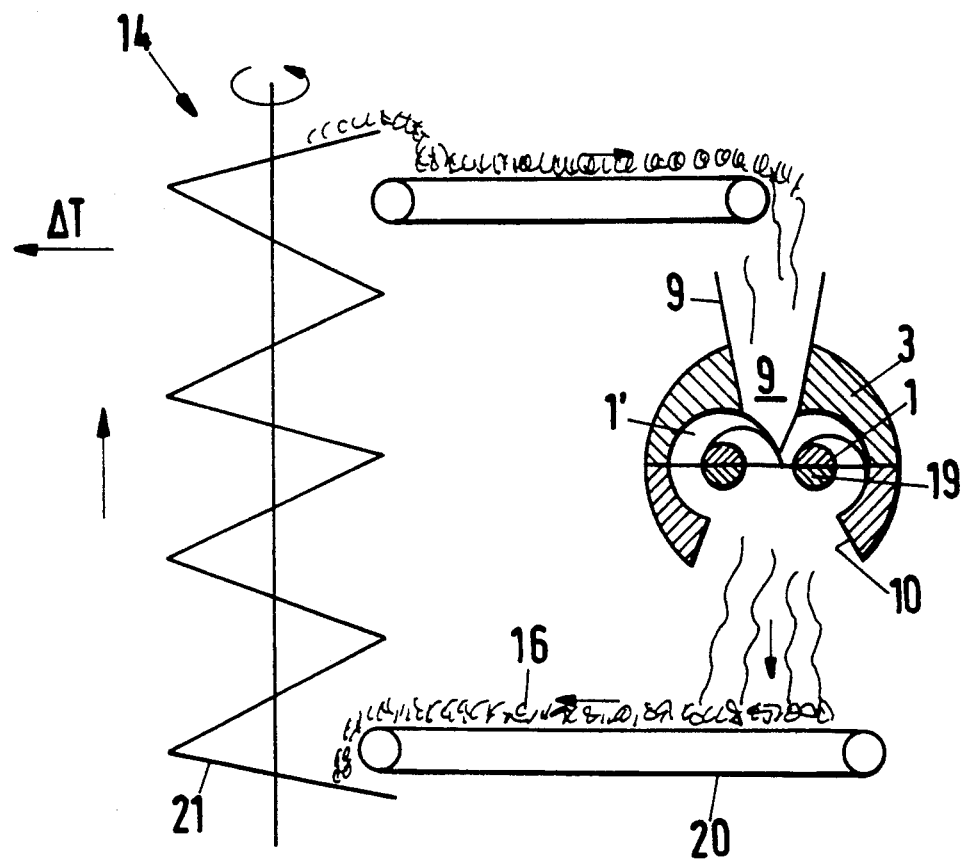
FIG. 2 is a section view taken along line II—II of FIG. 1 supplemented by schematic representations of a spiral conveyor and additional conveying devices; and, FIG. 3 shows the embodiment of FIG. 1 supplemented with a device for screening ground rubber stock for removing a portion thereof before the stock is supplied to the next adjacent downstream extruder section.

As shown in FIG. 2, the cooling units (13, 14, 15) can be designed as cooling spiral conveyors 21 or countercurrent air cooling devices, which cool the ground rubber stock to the temperature that is necessary for the conveying and grinding process in the next extruder section. If necessary, further conveying devices 20 (such as conveyor belts) for transporting the ground rubber stock between the particular discharge opening of the extruder and the cooling unit corresponding thereto as well as between the cooling unit and the feed opening 9 of the next adjacent section of the extruder corresponding thereto can be used.

The cooling of the ground rubber stock can be effected passively by simply exposing the stock to the ambient air as it is moved by spiral conveyor 21 and the conveying device 20. On the other hand, cooling can be effected by a blower 18 blowing cooling air in the direction of arrows 22. The spiral conveyor 21 moves the ground rubber stock upwardly in the direction of arrow 26 and arrow $\Delta T$ represents the heat removed from the ground rubber stock.

Another embodiment of the invention permits sufficiently fine ground rubber stock to be already separated in the cooling units or in additional devices (for example, by screening or classifying) arranged downstream. For example, and referring to FIG. 3, a screening unit 23 for screening the ground rubber stock is disposed downstream of the transport and cooling means 13 for removing a finely ground portion of the stock represented by arrow 24. The remaining coarser portion 27 is supplied to conveying zone 6 of the next extruder section (b).

For an optimum utilization of the individual extruder sections, the separated amount 24 of ground rubber stock can be replaced by a corresponding amount of coarse grained grinding rubber stock, which is additionally introduced through one or more feed openings. Means such as a chute or hopper (represented schematically by arrow 25) supplies the mass of coarse grained rubber stock into the feed opening 9 of the next section (b) for replacing the portion of ground rubber stock 24 removed. The mass of rubber stock added is coarser than the portion 24 of the ground stock removed.

A lower-grade embodiment of the invention may also be designed without cooling devices for the extruder and/or the extruder screw. In that case, the entire cooling capacity is provided by the cooling units.

It is understood that the foregoing description is that of the preferred embodiments of the invention and that various changes and modifications may be made thereto without departing from the spirit and scope of the invention as defined in the appended claims.

What is claimed is:

1. An apparatus for producing monodisperse powder from rubber or rubber articles, the apparatus comprising:

an extruder defining a flow direction and including a housing and a plurality of extruder sections disposed in said housing one downstream of the other in said flow direction;

each of said extruder sections being subdivided into a conveying zone, a grinding zone and a discharge zone;

each of said extruder sections having a feed opening formed in said housing so as to permit rubber stock to be ground to be passed into said conveying zone;

each of said extruder sections having a discharge opening formed therein so as to permit the ground rubber stock to be discharged from said discharge zone;

an extruder screw rotatably mounted in said housing so as to extend through said sections and being subdivided into a plurality of segments corresponding to respective ones of said sections;

each of said segments including: conveying flight means formed thereon in said conveying zone and combined conveying and grinding flight means formed thereon in said grinding zone;

said flight means being formed on each segment of said extruder screw so as not to extend into said discharge zone;

a plurality of transport and cooling units mounted outside of said extruder;

each one of said transport and cooling units including conveying means for conveying the ground rubber stock from the discharge opening of one of said sections to the feed opening of the next section directly downstream of said one section; and, each one of said transport and cooling units including cooling means for cooling said ground rubber stock as said ground rubber stock moves between the discharge and feed openings of mutually adjacent ones of said sections.

2. The apparatus of claim 1, each of said transport and cooling units including a spiral conveying device for transporting the ground rubber stock between the discharge and feed openings of two mutually adjacent sections.

3. The apparatus of claim 1, each of said transport and cooling means including an air counterflow cooling device having a solid matter separator.

4. The apparatus of claim 1, said housing having a wall portion facing downwardly; and, the discharge openings being formed in said wall portion.

5. The apparatus of claim 1, further comprising a plate mounted in said housing between each two mutually adjacent ones of said sections for blocking a movement of the ground rubber stock from the discharge zone of the upstream one of the mutually adjacent ones of said sections to the conveying zone of the downstream one of the two mutually adjacent ones of said sections.

6. The apparatus of claim 1, further comprising means for classifying and screening the ground rubber stock disposed downstream of at least one of said transport and cooling means for removing a portion of the ground rubber stock; means for supplying a mass of rubber stock into the feed opening of the next adjacent section for replacing the portion of ground rubber stock removed; and, said mass of rubber stock being coarser than the portion of the ground rubber stock removed.

7. The apparatus of claim 1, said extruder being a twin-screw extruder.

8. The apparatus of claim 1, first cooling means in said housing for cooling said housing; and, second cooling means for cooling said extruder screw.

9. An apparatus for producing monodisperse powder from rubber or rubber articles, the apparatus comprising:

an extruder defining a flow direction and including a housing and a plurality of extruder sections disposed in said housing one downstream of the other in said flow direction;

each of said extruder sections being subdivided into a conveying zone, a grinding zone and a discharge zone;

each of said extruder sections having a feed opening formed in said housing so as to permit rubber stock to be ground to be passed into said conveying zone;

each of said extruder sections having a discharge opening formed therein so as to permit the ground rubber stock to be discharged from said discharge zone;

an extruder screw rotatably mounted in said housing so as to extend through said sections and being subdivided into a plurality of segments corresponding to respective ones of said sections;

each of said segments including: conveying flight means formed thereon in said conveying zone and combined conveying and grinding flight means formed thereon in said grinding zone;

said flight means being formed on each segment of said extruder screw so as not to extend into said discharge zone;

a plurality of transport units mounted outside of said extruder; and, each one of said transport units including conveying means for conveying the ground rubber stock from the discharge opening of one of said sections to the feed opening of the next section directly downstream of said one section while simultaneously exposing the ground rubber stock to ambient air for passively removing heat therefrom.

10. The apparatus of claim 9, each of said transport units including a spiral conveying device for transporting the ground rubber stock between the discharge and feed openings of two mutually adjacent ones of said sections.

11. The apparatus of claim 9, said housing having a wall portion facing downwardly; and, the discharge openings being formed in said wall portion.

12. The apparatus of claim 9, further comprising a plate mounted in said housing between each two mutually adjacent ones of said sections for blocking a movement of the ground rubber stock from the discharge zone of the upstream one of the mutually adjacent ones of said sections to the conveying zone of the downstream one of the two mutually adjacent ones of said sections.

13. The apparatus of claim 9, further comprising means for classifying and screening the ground rubber stock disposed downstream of at least one of said transport units for removing a portion of the ground rubber stock; means for supplying a mass of rubber stock into the feed opening of the next adjacent section for replacing the portion of ground rubber stock removed; and, said mass of rubber stock being coarser than the portion of the ground rubber stock removed.

14. The apparatus of claim 9, said extruder being a twin-screw extruder.

15. The apparatus of claim 9, first cooling means in said housing for cooling said housing; and, second cooling means for cooling said extruder screw.

* * * * *